United States Patent [19]

Vulpe et al.

[11] Patent Number: 5,787,449

[45] Date of Patent: Jul. 28, 1998

[54] METHOD AND SYSTEM FOR MANIPULATING THE ARCHITECTURE AND THE CONTENT OF A DOCUMENT SEPARATELY FROM EACH OTHER

[75] Inventors: Michel J. M. G. Vulpe; Stephen P. Owens, both of Toronto, Canada

[73] Assignee: Infrastructures for Information Inc., Toronto, Canada

[21] Appl. No.: 253,263

[22] Filed: Jun. 2, 1994

[51] Int. Cl.$^6$ .................................................... G06F 17/00
[52] U.S. Cl. ........................................................ 707/513
[58] Field of Search ......................... 395/145–149, 395/155–161, 600, 400, 761, 762, 766, 772–778, 779, 784–786; 707/500, 501, 505–508, 511–516, 517, 522–524

[56] References Cited

U.S. PATENT DOCUMENTS

| | | |
|---|---|---|
| 5,133,051 | 7/1992 | Handley ................................ 395/148 |
| 5,280,574 | 1/1994 | Mizuta et al. ...................... 395/145 X |
| 5,404,435 | 4/1995 | Rosenbaum ........................ 395/149 X |
| 5,587,902 | 12/1996 | Kugimiya ................................ 395/798 |

*Primary Examiner*—Almis R. Jankus
*Attorney, Agent, or Firm*—Pillsbury Madison & Sutro LLP

[57] ABSTRACT

A system and method for the separate manipulation of the architecture and content of a document, particularly for data representation and transformations. The system, for use by computer software developers, removes dependency on document encoding technology. A map of metacodes found in the document is produced and provided and stored separately from the document. The map indicates the location and addresses of metacodes in the document. The system allows of multiple views of the same content, the ability to work solely on structure and solely on content, storage efficiency of multiple versions and efficiency of operation.

20 Claims, 9 Drawing Sheets

METHOD AND SYSTEM FOR MANIPULATING THE ARCHITECTURE AND THE CONTENT OF A DOCUMENT SEPARATELY FROM EACH OTHER

FIELD OF THE INVENTION

This invention relates to the manipulation of the architecture and content of a document, particularly for data representation and transformations, for use by computer software developers to remove dependency on encoding technology.

BACKGROUND TO THE INVENTION

The structure of a document has always been dictated by the format of the presentation of a document. For example, the fact that the title is, typically, centered and set apart from the body of the text gives it special weight in the reader's mind. Underlining or other emphasis in the main body is used to provide additional information about the content. Word underlining is often used to connote the fact that a set of words is the proper title. This is termed stream formatting because the format is contained within the 'stream' of words on the page.

This formatting convention has followed documents as they move from paper to electronic storage. Electronic documents retain the key idea of binding the structure of the material with its content through the use of formatting information. The formatting information in this case is in the form of codes inserted into the text stream. This invention addresses the ideas of structure and content in a new light to provide more flexible and efficient document storage and manipulation.

Manual document presentation has always consisted of putting words to paper in a formatted manner. Formatting is the process of adding anything to the document which is not strictly part of the content. Punctuation marks can be considered formatting, as is the extra line added between the title of an article and the main body.

As documents moved from manual creation to mechanical typesetting the formatting conventions created for manual material largely followed. At first it was the typesetters job to recreate the look of the manual page. Over time however typesetters began to specialize and develop new fonts and printing techniques which were not easily possible manually. It became easier to let the printer format the document according to the producer's needs.

To communicate those needs to the typesetter various so-called mark-up languages were created. These languages were in the form of codes in the margins of the manual text indicating what treatment the printer should give to each part of the document. A simple example would be the word 'bold' in the margin beside the title. This would tell the printer to choose a bold face title.

As documents moved into electronic format these conventions followed. Information stored in a computer was even less formatted than handwritten text. Initially, all that a computer document contained was a stream of characters and virtual line feeds to separate it into lines. The computer didn't even have an idea of a page. To communicate the format of the document, system designers fell back on the idea of embedded format codes.

One of the earlier systems to use this method was TROFF for the Unix operating system. TROFF allowed the operator to enter formatting codes in the form of 'dot commands'. These were entered on separate lines using a period followed by letters and numbers to specify the command. The text of the document was interlineated among these commands. For example, the command ".FS12" on a line by itself would specify that a 12 point font should be used for the following text.

A complete document consisted of the content plus the embedded formatting codes. If printed out as entered, without translation by a program which understood TROFF conventions, the document would be a series of lines separated by 'special' lines with only a dot command on them. The important point here is that the content and its formatting were combined.

One early innovation of the PC revolution was the replacement of manually entered dot commands by a menu driven interface. The WordStar word processing program allowed the user to select BOLD off a menu of formatting options. Behind the scenes it would then insert a BOLD command code into the text. To the user it would look like the word on the screen had turned bold and they would not have to be aware of the code inserted into their text. The system still required the use of explicit control codes for some effects, these codes were entered in a dot format quite similar to the TROFF system.

Word processing and desktop publishing systems have continued to advance their level of control and their ability to present a facsimile of the final printed image to the user for manipulation. There are now many different storage formats for digital documents. However, they all share one thing, the use of command codes inserted into the text stream to control the format of the document.

Some of these formats are being used as standards in the industry. Microsoft has developed a de facto standard for document interchange called the Rich Text Format, or RTF. Complete specifications for the format are available by order from Microsoft and on several electronic bulletin board systems. RTF defines specific command codes to be used and how they should be inserted into the content stream. There is great detail on the placement and spanning of particular code types.

Standard Generalized Markup Language, or SGML, is another standard which is gaining widespread use. It is defined in ISO Standard#8879. SGML is a highly structured set of characters which are used to mark portions of content. By convention SGML uses the '<' and the '>' or angle bracket characters as delimiters for tags which are outside the content. For example in a stream of characters like this: "the major <kword>industry</kword> in Canada is", the <kword> and </kword> are used to mark the beginning and end of a section of content which is to be treated as a "kword". The meaning of "kword" is up to the interpreter. SGML specifies rules for insertion of tags into the content stream and how tags are to be differentiated from the content.

One important point is that great emphasis is given to differentiating the tags from the content stream in which they exist. This is widely known to be a problem and the solution offered is a highly standardized sequence of characters used for the tags. These characters may not appear in the content of the document because they could not be distinguished from tags. SGML provides a partial solution by allowing the user to define the character used to distinguish a tag. The '{' and '}' characters could be substituted for angle brackets. Special notation has been developed to allow content that could be mistaken for tag delimiters to be represented symbolically. This provides a reasonable work around in specific cases but is not a general solution.

Document designers have long created sets of documents which all share a common structure. A fax cover sheet would be a good example. Although the content will differ from fax to fax the layout of the cover sheet should remain consistent. To support this requirement the concept of a style sheet has been developed. A style sheet provides a set of formats for a class of documents. It simplifies the task of creating multiple similar documents by providing a predefined set of options within which to work. Style sheets are still used to generate documents with embedded codes in the text stream. They merely make it more convenient to choose the correct codes and ensure they are applied uniformly.

The current practice outlined hereinabove suffers from the following disadvantages.

While embedding structural information in the content stream is accepted standard practice, it is inefficient and inflexible in a digital age. For manual production of documents the intermingling of the markup codes with the content is still the best way of communicating structure. For electronic storage and manipulation it suffers from a number of shortcomings.

Current practice suffers from inflexibility. Documents combining structure and content are inflexible because they tie together structure and content into a single unit which must be modified together. The content is locked into one structure embodied by the embedded codes. Changes to either the structure or the content of the document require a complete new copy of the document. To make changes to the original document structure a new copy of the document must be created. This new copy can either be saved independently resulting in two versions of the document, or it can be saved over the original—effectively destroying it. This is true even if the content does not differ in any way from the original. Similarly if the structure remains identical but the content changes slightly.

Further, current procedures are inefficient. Since document content is inextricably enmeshed with its format, each change to either the content or the format requires either that a whole new copy of the document be created, or that the original be overwritten. This becomes a serious problem for documents which are revised often, especially if the older revisions need to be kept.

Yet further, there is a difficulty of resolving the markup codes from the structure. Markup codes have to be differentiated from the content stream they are a part of. This involves designating 'special' characters or sequences of characters which should be identified and acted upon. This complicates the task of any routine which must work on the document. Any program or procedure which needs to format or understand the document must know all of the special codes and be able to correctly separate them from the content. All routines which work with the document must have exactly the same model of how the embedded codes are formatted or placed. If any operation misinterprets the code sequence even slightly, or mistakes content for formatting, the document or a part thereof will be reduced to meaninglessness.

Still yet further, existing practice has a processing speed disadvantage. To act upon a document combining structure and content requires that the stream be processed serially. Each token in the stream must be parsed to determine if it is a special formatting character or is part of the content.

It can therefore be seen that the practice of manipulating the architecture and content of a document of the prior art suffers from significant disadvantages.

SUMMARY OF THE INVENTION

It is an object of the present invention to provide an improved method of encoding a document.

It is a further object of the present invention to provide an improved system of encoding a document.

Thus, in sharp contrast to the prior art the present invention is based on the practice of separating encoding conventions from the content of a document. The invention does not use embedded metacoding to differentiate the content of the document, but rather, the metacodes of the document are separated from the content and held in distinct storage in a structure called a metacode map, whereas document content is held in a mapped content area. Raw content is an extreme example of mapped content wherein the latter is totally unstructured and has no embedded metacodes in the data stream.

A metacode, which includes but is not limited to a descriptive code, is an individual instruction which controls the interpretation of the content of the data, i.e., it differentiates the content. A metacode map is a multiplicity of metacodes and their addresses associated with mapped content. An address is the place in the content at which the metacode is to exert its effect.

Thus, these structures completely replace the concept of a document which combines content with embedded codes. Delivering a complete document would entail delivering both the content and a metacode map which describes it.

Accordingly, in its broadest aspect the invention provides a computer system for the manipulation of the architecture and content of a document having a plurality of metacodes and content by producing a first map of metacodes and their addresses of use in association with mapped content; the system comprising metacode map distinct storage means; means for providing a menu of metacodes to the metacode storage means; and means for compiling the metacodes of said menu by locating, detecting and addressing the metacodes to constitute the map and storing the map in the metacode storage means.

By "detecting" is meant recognizing, identifying or differentiating a metacode from content; by "locating" is meant finding the position of a metacode in and relative to an input content stream; and by "addressing" is meant forming a unique identifier which defines the position of a metacode relative to the mapped content stream. The invention, in one aspect, utilizes detecting means, locating means and addressing means.

Most often, the system further comprises mapped content storage means which is distinct and separate from the map storage means.

In a preferred aspect, the invention further provides a system as hereinabove defined further comprising means for reading a document having first content and a first multiplicity of metacodes constituting, in whole or in part, the menu and means for detecting, locating and storing the first multiplicity of metacodes constituting, in whole or in part, the menu and detecting, locating and storing the first multiplicity of metacodes, in whole or in part, to constitute the map.

By the term "document" as used in this specification is meant a non-random aggregation of data irrespective of its mode of storage or presentation. By the term "amending" in relation to amending a metacode map is meant changing, for example, by adding, deleting, recording and rearranging, or substituting some or all of the metacodes and attendant addresses. An example of metacode language of use in the practice of the invention is SGML.

The system according to the invention may be operated with a programmable processing system capable of input/output operations, integer calculations, logical operations and flow control, mass storage device with read/write access and an input device, i.e., keyboard and screen and intercomputer communications link. A specific example of such an acceptable computer system comprises a Quadra 800 personal computer, a standard Apple 14" monitor, a standard Apple keyboard, working storage (RAM), primary storage hard disk, programming language supporting I/O, integer calculations, and logical operations and flow control.

The system and process of the invention as hereindefined further comprises computing apparatus and use thereof in the practice of the invention.

The invention is also of value in that the creation of the metacode map in the system and method of the invention enables the multiplicity of metacodes to be compared with a predetermined set of criteria.

Accordingly, the invention in a further aspect provides a system as hereinabove defined further comprising means for comparing the multiplicity of metacodes in the map with a predetermined set of criteria. The means for applying a first map to mapped content to provide first differentiated data comprises application software.

The system as hereinabove defined may, optionally, further comprise one or more application software means constituting (a) means for providing a multiplicity of maps associated with a single mapped content, (b) means for amending a plurality of maps in consequence of an amendment to mapped content, (c) means for amending a first plurality of maps to produce a second plurality of amended maps in a plurality of distinct storage means, and (d) means for amending a plurality of maps in consequence of an amendment of an associated metacode map.

The system of the invention further comprises means for enabling a metacode map to be amended to produce an amended map for application to original mapped content, amended content or fresh content.

In a further aspect the invention provides a method for producing a first map of metacodes and their addresses of use in association with mapped content and stored in distinct map storage means; said method comprising providing the mapped content to mapped content storage means;

providing a menu of metacodes; and compiling a map of the metacodes in the distinct storage means.

The method, optionally, further comprises detecting and locating a multiplicity of metacodes constituting the menu in a document; storing the multiplicity of metacodes, in whole or in part, in the distinct storage means; detecting and locating mapped content in the document; and storing the mapped content, in whole or in part, in the mapped content storage means.

It further, optionally, further comprises comparing the multiplicity of metacodes in the map with a predetermined set of criteria.

In a yet further aspect the invention provides a map of metacodes stored in distinct metacode storage means.

In the case where an existing document is decomposed into its distinct metacode map and mapped content, either in whole or in part, and a new document, optionally, created therefrom, the following steps in general should be followed:

(a) the content of the document is read until a metacode is found;

(b) the content is copied and stored in the mapped content means;

(c) an entry in the map is made noting the metacode and its position in the content (in the case of purely textual content the position could be stored as the number of characters in the mapped content before the code);

(d) steps one to three are repeated until the document has been completely read; and (e) the original document may optionally now be discarded since the mapped content together with the metacode map completely describe it.

Creating a new document as mapped content plus a metacode map is done as follows:

(a) all content is placed into a mapped content storage means;

(b) for each metacode applied to the content an entry in the metacode map is created which describes the metacode and gives its position;

(c) the mapped content area and metacode map is updated as changes are made; and (d) the mapped content area and the document map are individually stored.

The present invention has a number of benefits over documents combining content with embedded codes. Most of the benefits flow from the fact that the invention recognizes the separateness of content and structure. Document structure is dependent on a number of factors; such as how the document will be used, its intended audience, required formats for special uses, and the like. Content is generally less variable.

Technical documentation for example has a large volume of very consistent content about the topic. The content is usually about a real world product or process, and it will not change unless the product or process does. The presentation and structure of that information will change depending on its intended use. Two revisions of a manual for a piece of equipment may format the same information in very different ways. Additionally, its whole structure may be changed to reuse the components of the content in a technical paper rather than a manual.

The present invention allows of multiple views of content. Separating content from its structure allows the invention to provide multiple views of the same content. If a different metacode map is applied to the same raw content a new view of that content can easily be generated. For example a set of design notes for an industrial process could be viewed as a training manual or repair manual simply by changing the metacode map used with the content.

Such a change may be deeper than just the look of the two documents. The map can be used to divide the content into objects definable in human terms, like title, paragraph, footnote, and the like. These objects can be easily redefined in a different map which shares the same content. This allows multiple interpretations of the same content, not just multiple looks. It should be noted that the maps may be asynchronous with regard to the content that is referred to. The map elements of multiple maps have no fixed relation to each other, either in terms of their position within the content or the number of elements defined. In SGML this ability to overlay two or more structures on a single set of text is called Concur. Its usefulness has long been recognized but it has proven difficult to implement. In large part this is due to the nature of codes embedded in the text stream.

Multiple maps are not the same thing as creating two copies of the document with different embedded codes. Multiple views using embedded codes means that there must be multiple copies of the content of the document. Whenever a change is made to the content of one view that change must be reapplied to each view separately. This greatly increases the problem of managing and synchronizing multiple views of a document.

Multiple views using the invention share the same mapped content. Changes made to the mapped content will automatically be reflected in all views which use that mapped content. One copy of the content makes document management far easier and much more reliable.

The present invention provides the ability to work solely on metacodes. The process allows changes to be made to the structure of a document without requiring the content. A metacode map could be edited directly without the mapped content. Additionally a new map can be created based solely on an existing map without requiring the content. This allows changes to be made to the appearance or structure of a document by individuals who may not be allowed to modify the content. Document security can be significantly enhanced since the metacodes and content of the document are separately stored and protected.

The present invention further provides the ability to work solely on content. Conversely changes to the content can be made without the overhead of a completely encoded document. This can be important because complicated coding conventions often get in the way of the content. For example, a copy writer has no interest in the intended layout of his copy until it is complete and correct. The invention allows new maps to be created using just content without reference to existing maps.

The present invention also provides for storage efficiency of multiple versions. The invention allows much more efficient storage of multiple copies of differently encoded documents. If the content is invariant and only the metacodes change it is inefficient to store multiple copies of the content. According to the prior art in the field this would be required if both versions are to be kept. Using the invention only a new metacode map has to be stored.

The ratio of metacodes to content is dependent on the metacodes chosen as well as the document type. Ratios of 1:100 would not be unusual, particularly where the metacodes involved are text formatting codes, and 1:1 would be an extreme case. That means that the invention will require significantly less than half the storage space for multiple versions compared to prior methods.

The present invention provides also for efficiency of operation on the document. The invention allows document operations to be much more efficient. It is no longer necessary to parse the entire document to locate the embedded codes. Differentiating codes from content is obviously no longer a problem since they are held in different areas. This also allows more efficient coding strategies to be developed without the restriction of ensuring that all codes are clearly differentiated from any possible content.

Removing the problem of differentiating the codes from the content has the additional benefit of allowing more flexibility in the content. Systems which rely on embedded codes to encode a document are fragile if any of those codes appear in the content of the document. In contrast the invention is indifferent to the characters in the content. In effect there need not be any special characters in the mapped content, all characters are treated equally. This makes documents which use the invention to be less fragile.

Many operations which would previously have required scanning the entire document can now be done with just the metacode map. This is a much smaller, simpler structure than a document with embedded codes. Similarly some operations can be performed solely on the content without regard for the encoding. Indexing would be a good example of such an operation.

The system of the invention may be implemented using maps and mapped content broken into three sections. The first section involves decomposing existing documents into a representative map and its associated mapped content. The second involves creating or editing a document consisting of content plus a metacode map. The third is building a combined view from the constituent parts, which is necessary because interaction with the document may be done as a visual whole rather than in its constituent parts.

BRIEF DESCRIPTION OF THE DRAWINGS

In order that the invention may be better understood preferred embodiments will now be described by way of example only with reference to the accompanying drawings wherein.

DETAILED DESCRIPTION OF THE INVENTION

Figure 1:
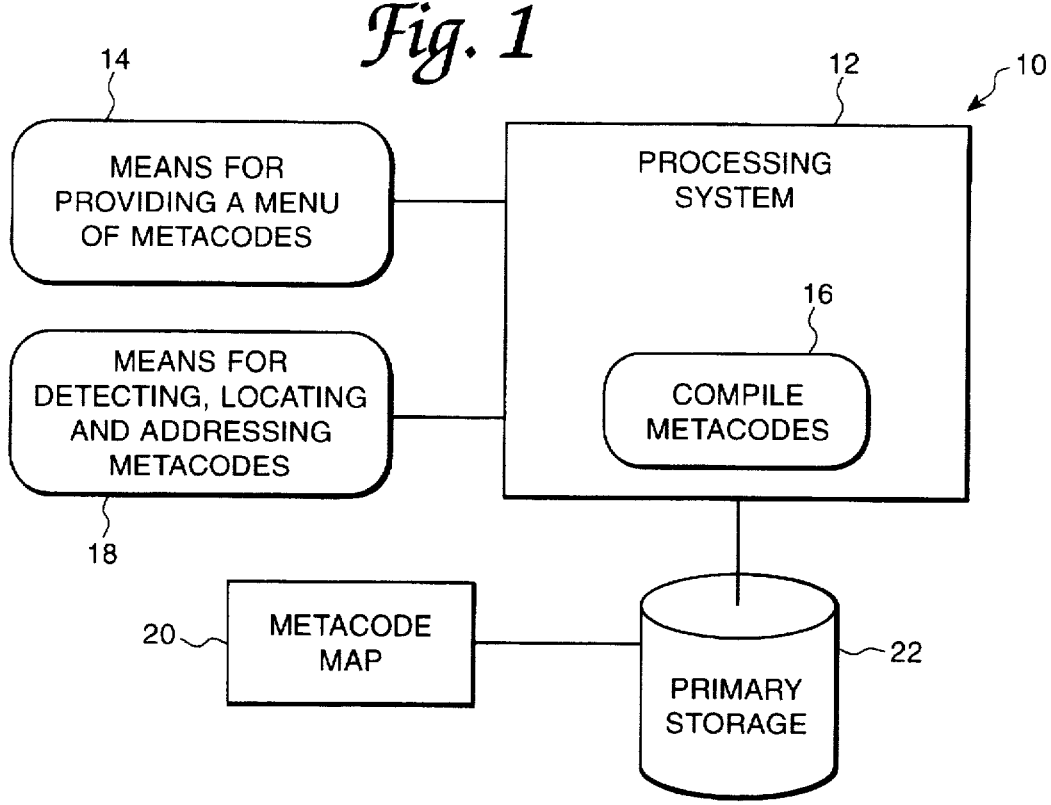
FIG. 1 is a broad flow diagram representing main components of a system and method for the manipulation of architecture and content of a document.

The invention may in one aspect be described with reference to the decomposition of an existing document with reference to SGML metacode language embedded in the text. The object is to turn this document into two components, the mapped content and a metacode map. Once done, the original document can be, optionally, thrown away since it is completely replaced by the two new components.

The following instructional steps are presented once the document has been read:
1. Start at Character Position zero.
2. Create storage space for the raw content.
3. Create storage space for a metacode map.
4. Set the elements in the map to zero.
5. Read characters until a metacode is encountered based on metacode detection criteria.
6. Copy the characters up to the start of the code into the mapped content storage or area.
7. Increase the character position by the number of characters placed into the mapped content area.

8. Create a new map element and place the code into it.
9. With the map element store the character position of the beginning of the code.
10. If there are more characters in the original then go to step 5.
11. Conversion is complete. store the metacode map and the mapped content.

In greater detail, the following example with a simple SGML document having the title "The Secret Life of Data" is as follows.

```
<Chapter><Title>The Secret Life of Data</Title><Para>Data is
hostile. </Para>The End</Chapter>
A person who knew SGML would read this document as follows.
        - begin Chapter tag.
        - begin Title tag.
        - CDATA (the content of the Title tag)
        - end Title tag.
        - begin Para tag
        - CDATA (the content of the para tag)
        - end Para tag, CDATA the content of the Chapter tag, end
          Chapter tag
Following the algorithm as outlined above the following is obtained.
Character position = 0
map elements = 0
raw content =
metacode map =
read characters until code reads to <Chapter> which is a complete code.
raw content =
character position = 0
metacode map = 1 is <Chapter> at character position 0
map elements = 1
read characters until code reads to <Title> which is the next code.
raw content =
character position = 0
            metacode map = 1 is <Chapter> at character position 0
                         2 is <Title> at character position 0
map elements = 2
read characters until code reads to </Title> which is the next code.
raw content = The Secret Life of Data
character position = 0 + 23 = 23
            metacode map = 1 is <Chapter> at character position 0
                         2 is <Title> at character position 0
                         3 is </Title> at character position 23
map elements = 3
read characters until code read to <Para> which is the next code.
raw content = The Secret Life of Data
character position = 23 + 0 = 23
            metacode map = 1 is <Chapter> at character position 0
                         2 is <Title> at character position 0
                         3 is </Title> at character position 23
                         4 is <Para> at character position 23
map elements = 4
read characters until code read to </Para> which is the next code.
raw content = The Secret Life of DataData is hostile.
character position = 23 + 16 = 39
            metacode map = 1 is <Chapter> at character position 0
                         2 is <Title> at character position 0
                         3 is </Title> at character position 23
                         4 is <Para> at character position 23
                         5 is </Para> at character position 39
map elements = 5
read characters until code read to </Chapter> which is the next code.
raw content = The Secret Life of DataData is hostile.The End
character position = 39 + 7 = 46
            metacode map = 1 is <Chapter> at character position 0
                         2 is <Title> at character position 0
                         3 is </Title> at character position 23
                         4 is <Para> at character position 23
                         5 is </Para> at character position 39
                         6 is </Chapter> at character position 46
map elements = 6
There are no more characters so the conversion is complete. The final raw
content area and metacode map look like this.
Raw Content = The Secret Life of DataData is hostile.The End
```

Metacode Map

| Element Number | Element | Character Position |
|---|---|---|
| 1 | <Chapter> | 0 |
| 2 | <Title> | 0 |
| 3 | </Title> | 23 |
| 4 | <Para> | 23 |
| 5 | </Para> | 39 |
| 6 | </Chapter> | 46 |

In the following example a new document is created.

Creating a new document consists of building a metacode map and a raw content area. It is certainly possible that this process could be done directly by a document's author. However, working in such an un-natural fashion would not be very efficient. It is far more likely that the author would work on a composite view of the document and the components would be built behind the scenes.

The basic algorithm for building the necessary metacodes while an interactive editing session is going on is as follows, for example.

Steps;

1) set the character position to zero.
2) set the number of elements in map to zero;
3) create space for raw content;
4) create space for metacode map;
5) wait for one of the following actions:
    create a new element definition
    add content
    stop;
6) if the action is Stop, then go to step 14;
7) If the action is add content, then go to step 11;
8) Increase the element number by one;
9) Add the element definition to the metacode map at the indicated element number;
10) Go to step 5;
11) Get a character and place it into the raw content area at the current character position;
12) Increase the character position by one;
13) Go to step 5;
14) Done.

EXAMPLE

As is described with reference to the example involving decomposition of a document, the original document from a set of commands may be rebuilt. So following the algorithm gives:
current map element number=0
character position=0
raw content=
command is Create New Element <Chapter>
increase the element number by 1=1
add map element=1, <Chapter> at character position 0
command is Create New Element <Title>
increase the element number by 1=2
current map element=2, <Title> at character position 0
command is add content: The Secret Life of Data
place each character into the raw content area
increase the character position by 1 as the character is added after all characters are added
raw content area is: The Secret Life of Data
character position is 23
command is Create New Element </Title> increase the element number by 1=3
current map element=3, </Title> at character position 23
command is Create New Element <Para>
increase the element number by 1=4
current map element=4, <Para> at character position 23
command is add content: Data is hostile.
place each character into the raw content area
increase the character position by 1 as the character is added
after all characters are added
raw content area is: The Secret Life of DataData is hostile.
character position is 39
command is Create New Element </Para>
increase the element number by 1=5
current map element=5, </Para> at character position 39
command is add content: The End
place each character into the raw content area
increase the character position by 1 as the character is added
after all characters are added
raw content area is: The Secret Life of DataData is hostile. The End
character position is 46
command is Create New Element </Chapter>
increase the element number by 1=6
current map element=6, </Chapter> at character position 46
Command is Stop.

The final raw content area and metacode map look like this.

Raw Content=The Secret Life of DataData is hostile. The End

| Metacode Map | | |
|---|---|---|
| Element Number | Element | Character Position |
| 1 | <Chapter> | 0 |
| 2 | <Title> | 0 |
| 3 | </Title> | 23 |
| 4 | <Para> | 23 |
| 5 | </Para> | 39 |
| 6 | </Chapter> | 46 |

Building a Document View

Documents will frequently have to be rebuilt as a composite of their structure and content rather than as two discrete elements. This is true when taking a hard copy of the document, or for sending it to a system which only deals with documents containing embedded codes. An algorithm for building a composite document from its metacode map and raw content is presented hereinbelow.

Steps
1) Set the current map element number to one.
2) Set the current character position to zero.
3) Get the current map element as designated by the map element number.
4) Read from the current character position in the raw content to the character position of the map element.
5) Set the current character position in the raw content to the character position of the map element.
6) Write the raw content that was read in step 4 to the composite document.
7) Write the element from the current map element to the composite document.
8) Increase the current map element number by 1.
9) If there are more map elements then go to step 3.
10) Write any remaining content, from the last element position, to the end of the raw content area, to the composite document.
11) Composite document is complete.

Example

Following the example hereinabove from the decomposition section the original document from its metacode map and raw content area is rebuilt. The map and raw content are as follows.

Raw Content=The Secret Life of DataData is hostile. The End

| Metacode Map | | |
|---|---|---|
| Element Number | Element | Character Position |
| 1 | <Chapter> | 0 |
| 2 | <Title> | 0 |
| 3 | </Title> | 23 |
| 4 | <Para> | 23 |
| 5 | </Para> | 39 |
| 6 | </Chapter> | 46 |

So following the algorithm gives:
current map element number=1
character position=0
composite document=
current map element=1, <Chapter> at character position 0
read from character position=0 to element position=0
write to composite document
composite document=
current character position=0
write current map element to composite
composite=<Chapter>
Increase map element number by 1=2
current map element=2, <Title> at character position 0
read from character position=0 to element position=0
write to composite document
composite document=<Chapter>
current character position=0
write current map element to composite
composite=<Chapter> <Title>
Increase map element number by 1=3
current map element=3, </Title> at character position 23
read from character position=0 to element position=23
write to composite document
composite document=<Chapter> <Title> The Secret Life of Data
current character position=23
write current map element to composite
composite=<Chapter> <Title> The Secret Life of Data </Title>
Increase map element number by 1=4
current map element=4, <Para> at character position 23
read from character position=23 to element position=23
write to composite document
composite document: <Chapter> <Tide> The Secret Life of Data </Title>
current character position=23
write current map element to composite
composite: <Chapter> <Title> The Secret Life of Data </Title> <Para>
Increase map element number by 1=5
current map element=5, </Para> at character position 39
read from character position=23 to element position=39
write to composite document
composite document: <Chapter> <Title> The Secret Life of Data
current character position=23
write current map element to composite
composite: <Chapter> <Title> The Secret Life of Data </Title> <Para> Data is hostile. </Para>

Increase map element number by 1=6
current map element=6, </Chapter> at character position 46
read from character position=39 to element position=46
write to composite document
composite document: <Chapter> <Title> The Secret Life of Data </Title> <Para> Data is hostile. </Para> The End
current character position=39
write current map element to composite
composite: <Chapter> <Title> The Secret Life of Data </Title> <Para> Data is hostile. </Para> The End </Chapter>
Increase map element number by 1=7
No more elements, no more content in the raw content area.

Composite document is complete. The final composite document output is: <Chapter> <Title> The Secret Life of Data </Title> <Para> Data is hostile. </Para> The End </Chapter>

Reference is now made to FIG. 1 which shows generally as 10 a system and process which make up a metacode map system. A processing system, shown as Box 12, generates a menu of metacodes through the instructions for providing a menu of metacodes shown as Box 14. It compiles the metacodes, shown as Box 16, using the means for detecting, locating, and addressing shown as Box 18. Finally the processing system 12 stores the metacode map, shown as Box 20, in primary storage shown as Box 22.

Figure 2:
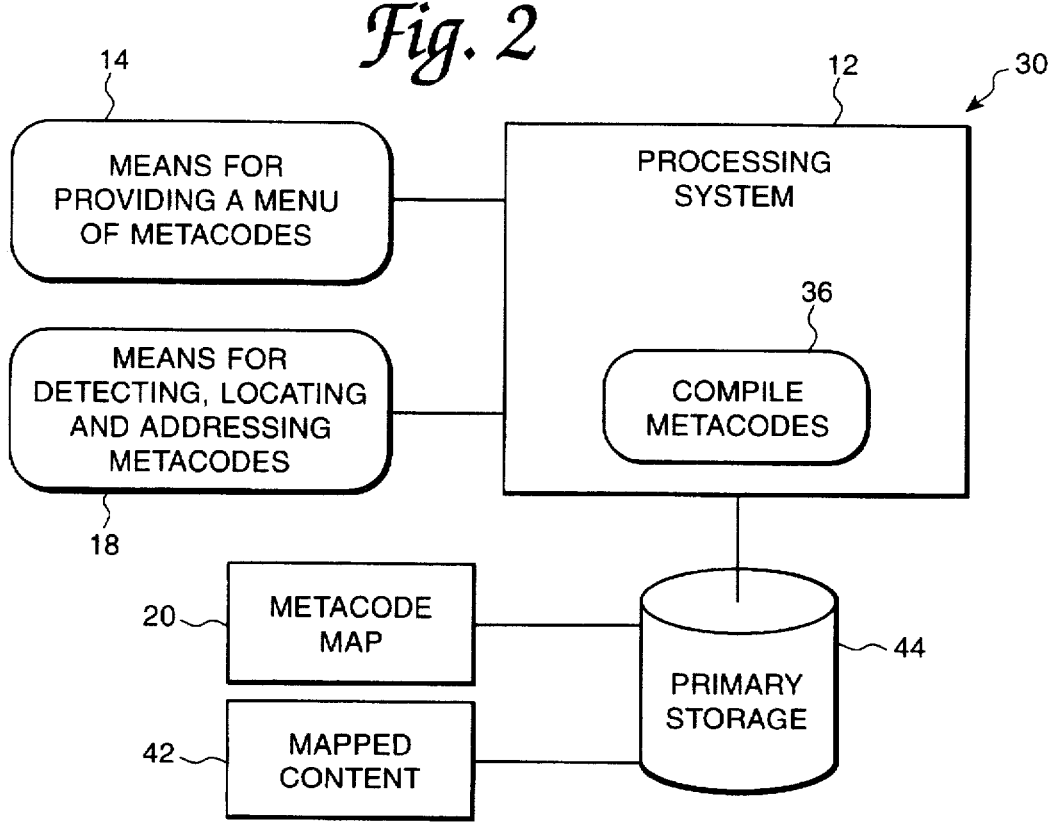
FIG. 2 is the diagram of FIG. 1 further comprising associated mapped content storage.

FIG. 2 shows generally as 30 the basic system with all of the components outlined in the description of FIG. 1. In addition, it maintains distinct mapped content storage as represented by Box 42. The processing system, presented as Box 36 must store and retrieve the mapped content, shown as Box 42.

Figure 3:
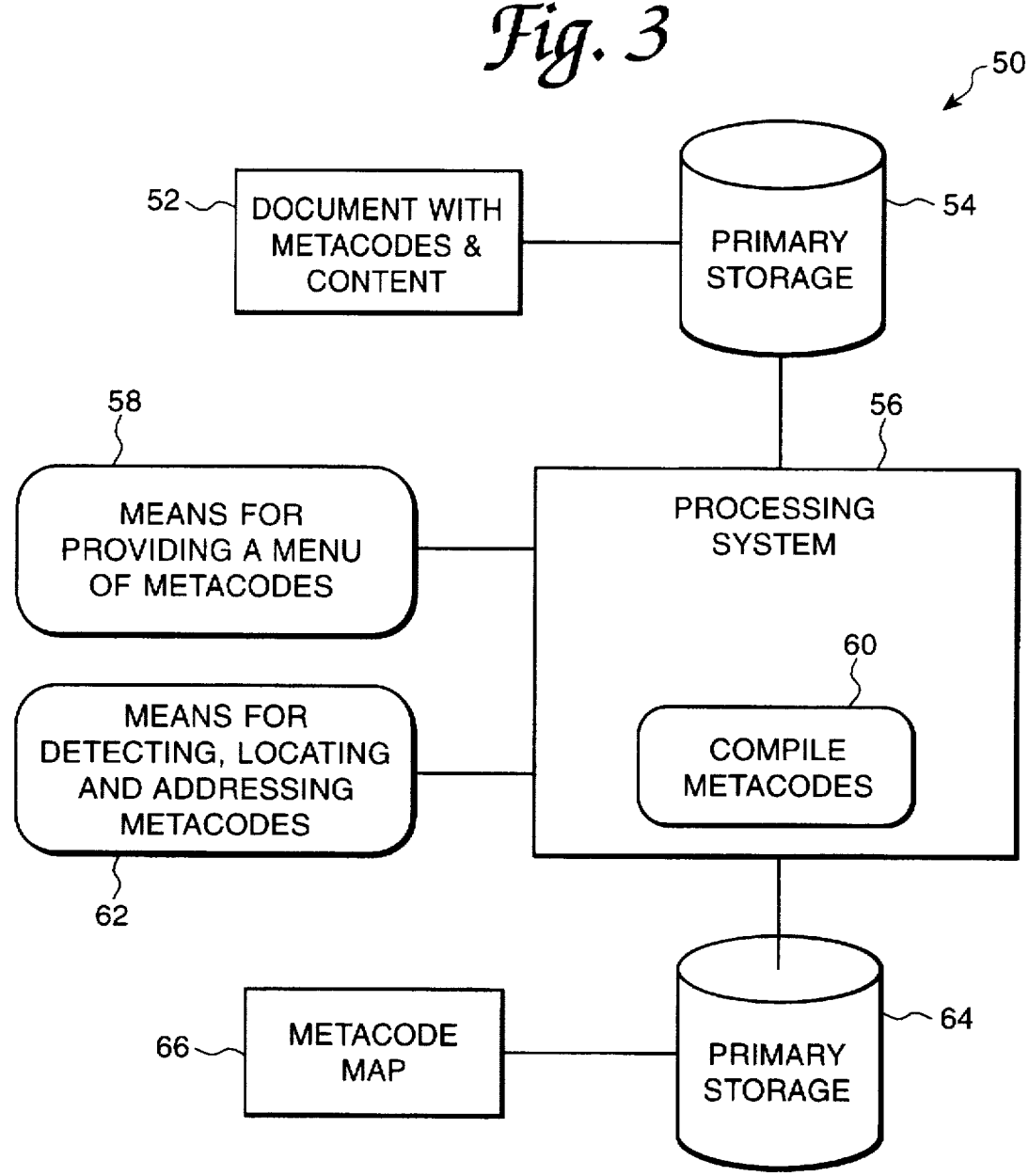
FIG. 3 is a broad flow diagram representing a document being decomposed into a map according to the system and method of the invention.

FIG. 3 shows generally as 50 a system and process for reading a document containing metacodes and content and producing a metacode map. The document represented by Box 52 is stored in primary storage as represented by Box 54. The processing system, represented by Box 56, reads document, shown as Box 52 from storage shown as Box 54. As the document shown as Box 52 is read the processing system, represented by Box 56, detects metacodes by use of means to detect metacodes represented by Box 58. The metacodes are compiled, shown in Box 60, using the means for detecting, locating, and addressing the metacodes provided in Box 62. The metacode map which is generated by this process is stored in primary storage, represented as Box 64 as metacode map shown as Box 66.

Figure 4:
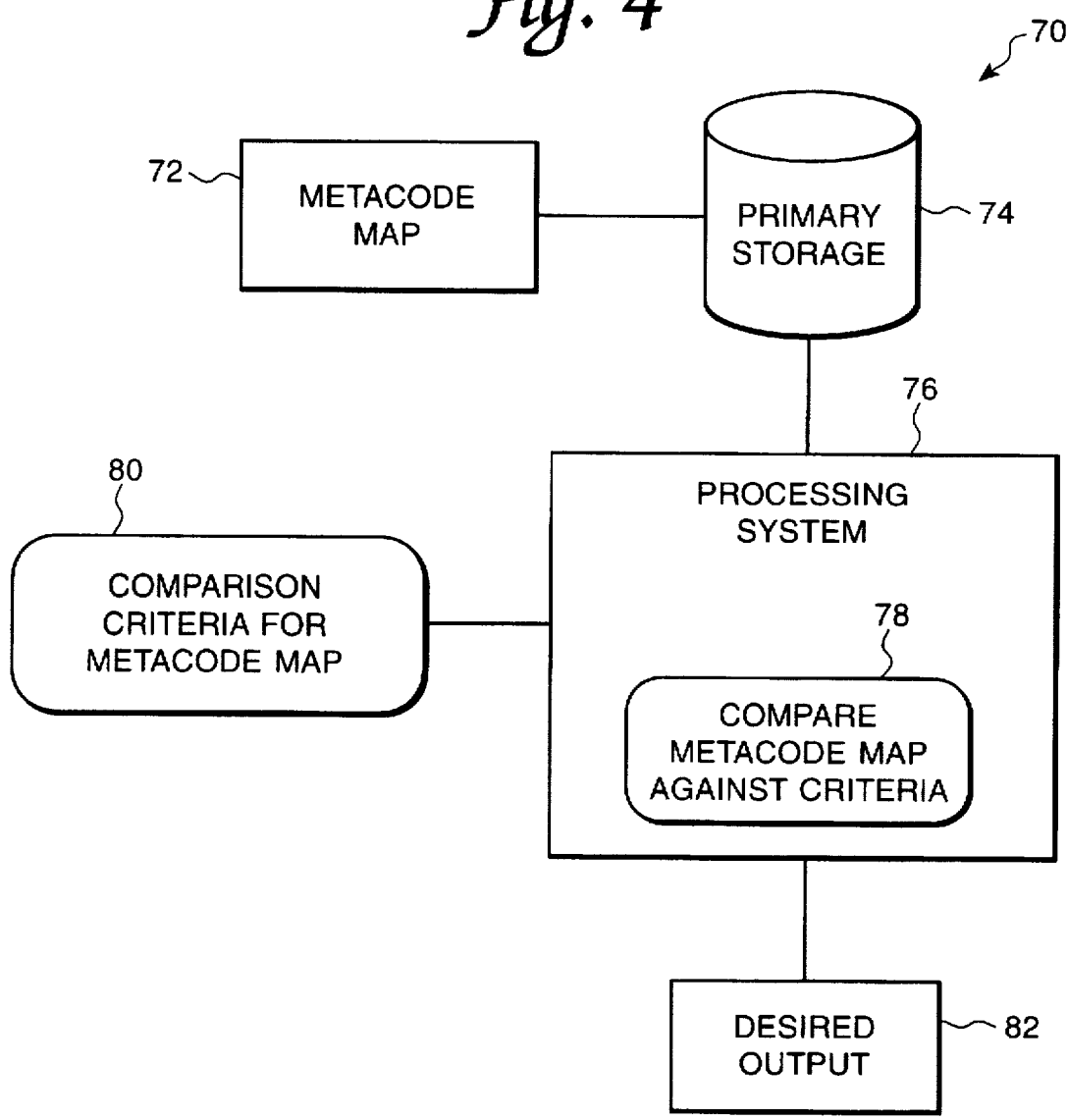
FIG. 4 is a broad flow diagram representing a map being compared to specified criteria according to the system and method of the invention.

FIG. 4 shows generally as 70 a system and process for comparing a metacode map against a known set of criteria. The map, represented by Box 72, is stored in primary storage, represented by Box 74. The processing system 76 reads metacode map 72. Processing system 76 performs the comparison shown as Box 78. The metacode map is compared against criteria, shown as Box 80, which is provided to the processing system. The processing system 76 outputs the results of this comparison, as shown by Box 82. This output may take a variety of forms such as a print out or a set of inputs to another process.

Figure 5:
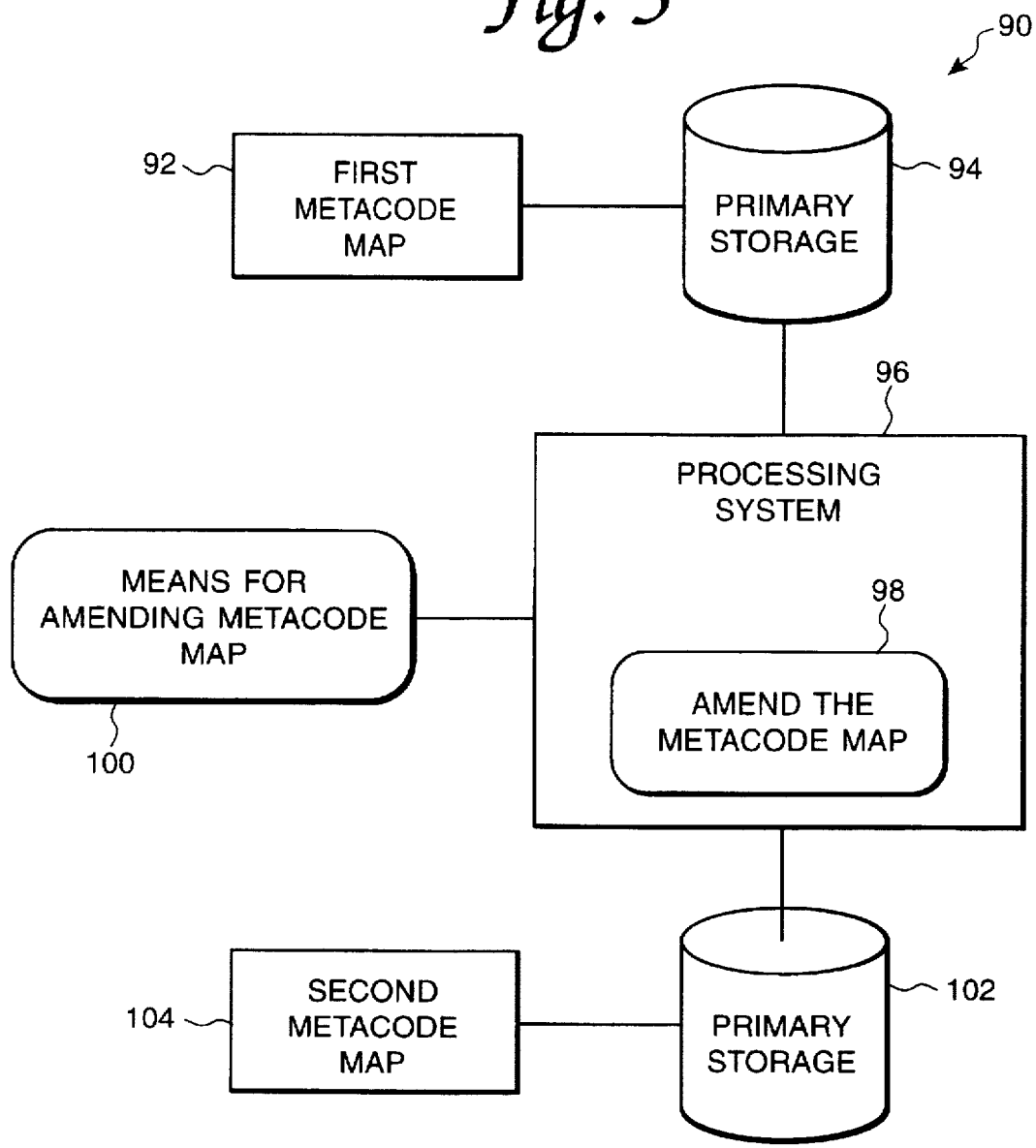
FIG. 5 is a broad flow diagram representing a map being transformed to create a second map according to the system and method of the invention.

FIG. 5 shows generally as 90 a system and process for amending a metacode map to produce a second metacode map. The original map, shows as Box 92 is stored in primary storage 94. The processing system, represented by Box 96, reads the metacode map 92. As the map is read it is amended by a process shown as Box 98. This process step requires instructions, shown in Box 100, for amending the map. The map, as amended by process step 98, is stored in primary storage 102 as the second metacode map 104.

Figure 6:
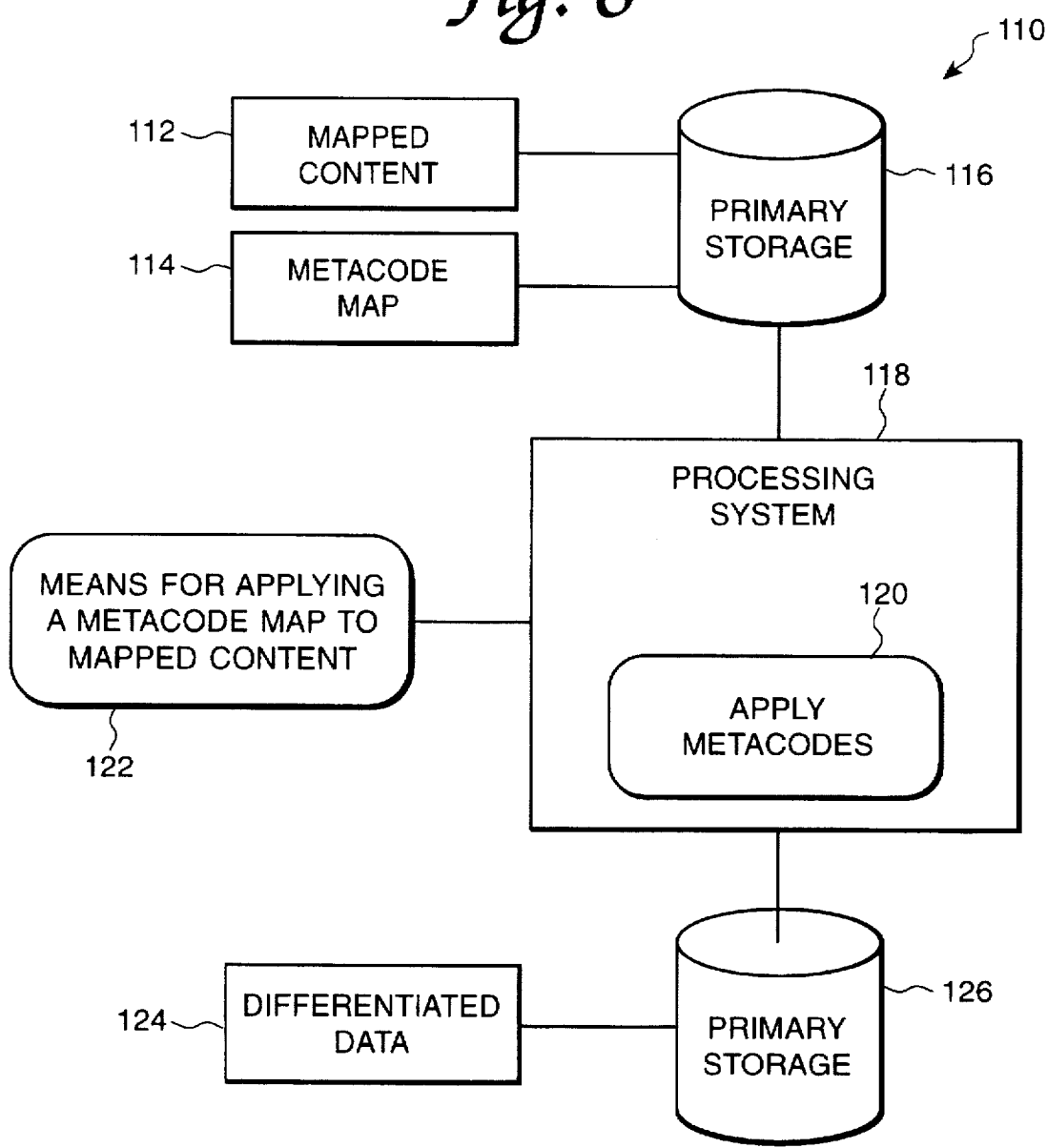
FIG. 6 is a broad flow diagram representing a map being applied to its associated content to create differentiated data according to the system and method of the invention.

FIG. 6 shows generally as 110 a system and process for applying a metacode map to mapped content to produce differentiated data. The mapped content, shown as Box 112 and the metacode map, shown as Box 114 are stored in primary storage, shown as Box 116. The processing system 118 reads both the metacode map, Box 114 and the mapped content 112. The metacodes are applied to the content in a process shown as Box 120. Means, shown as Box 122, for applying the metacode map to the mapped content are fed to the processing system to enable it to apply the metacode map to the mapped content. The processing system then stores the resultant differentiated data, shown as Box 124, in primary storage shown as Box 126.

Figure 7:
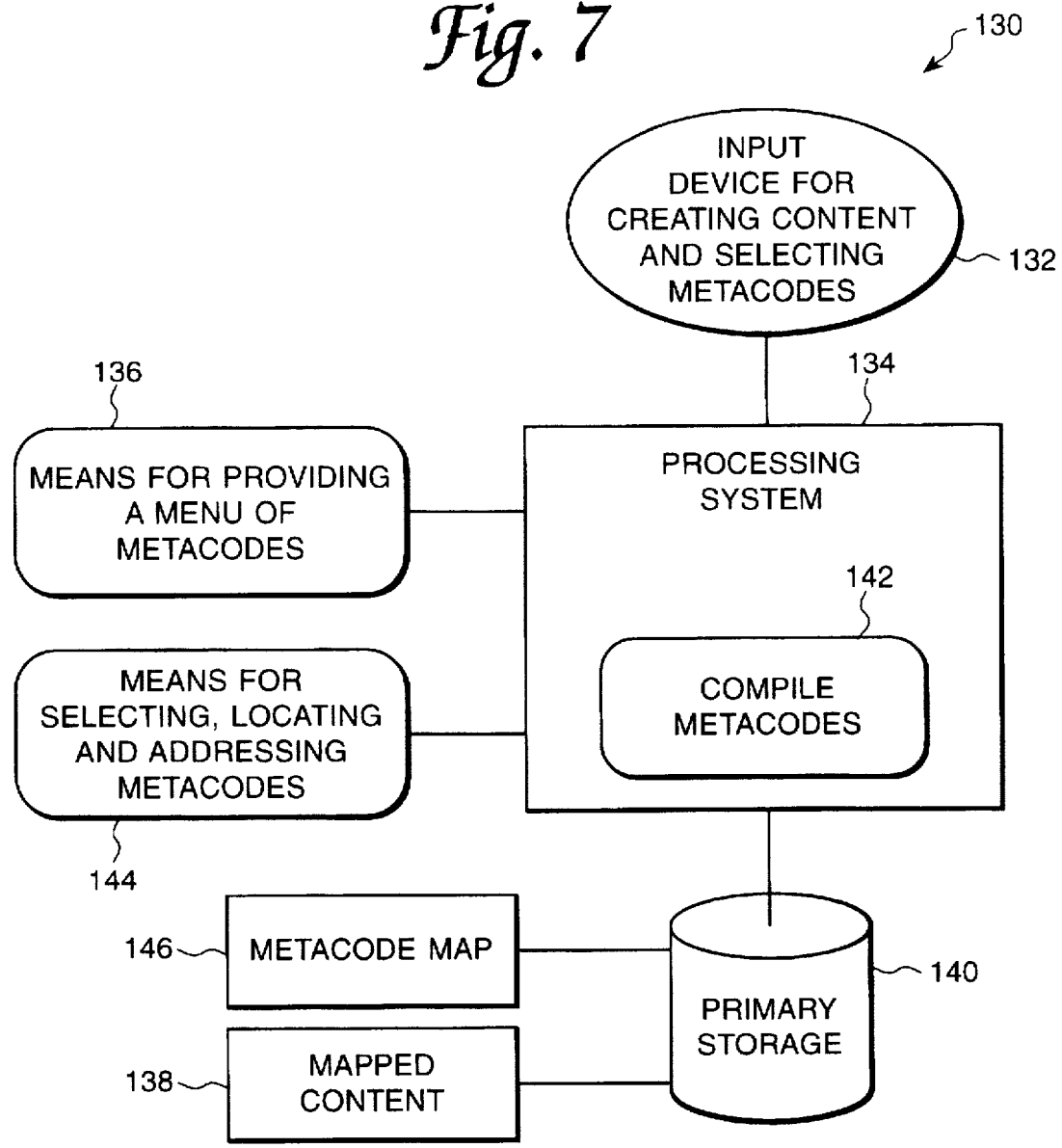
FIG. 7 is a broad flow diagram representing document creation according to the system and method of the invention.

FIG. 7 shows generally as 130 a system and process for creating a new document having a metacode map and associated mapped content. The system has an input process, shown as Box 132, which produces content and selects metacodes for use with the content. An example of such an input process would be a computer monitor and keyboard combined with a human operator. The processing system, shown as Box 134, produces a menu of metacodes to select from using the instructions provided in Box 136. Content input from the input process represented by Box 132 is written to mapped content storage, represented by Box 138 and is stored in primary storage represented by Box 140. Metacodes selected at the input process, represented by Box 132, are fed to a process, represented by Box 142, which compiles the selected metacodes using the means for selecting, locating, and addressing metacodes represented in Box 144. The output of this compilation process is a metacode map which is stored in primary storage, represented by Box 140, in metacode map storage represented by Box 146.

Figure 8:
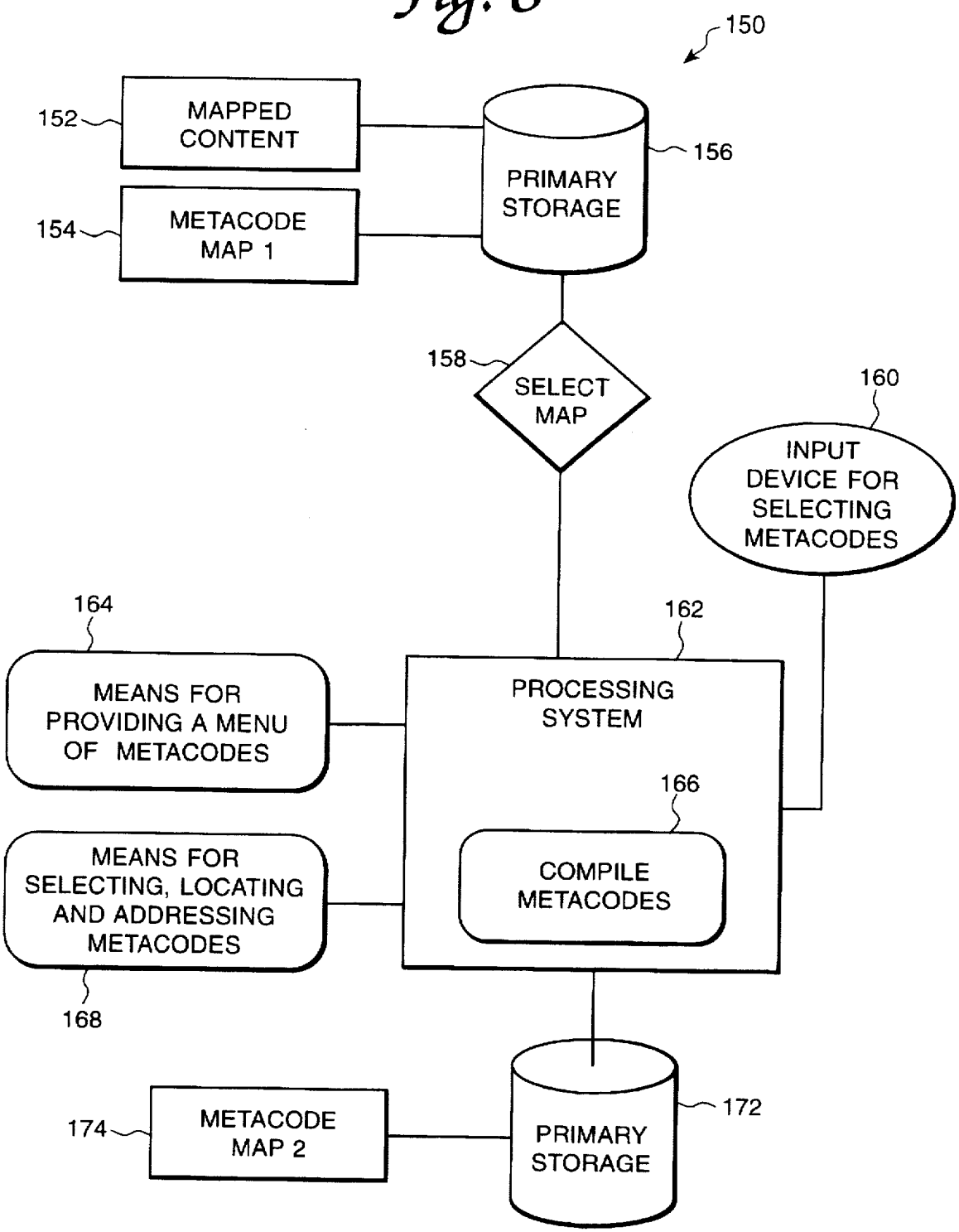
FIG. 8 is a broad flow diagram representing the creation of a second map associated with existing content according to the system and method of the invention.

FIG. 8 shows generally as 150 a system and process for creating a second metacode map associated with mapped content. The mapped content, represented by Box 152 and a first metacode map, represented by Box 154, are stored in primary storage represented by Box 156. To start the session a map is selected at by the process represented by Box 158. In this example the selection is to create a new map. The input process, shown as Box 160, is used for selecting map elements for the new map. The processing system, shown as Box 162 produces a menu of metacodes to select from using means as represented in Box 164. Metacodes selected at input process, represented by Box 160, are fed to a process, shown as Box 166, which compiles the selected metacodes using the means for selecting, locating and addressing metacodes, shown as Box 168. The output of this compilation is a new metacode map, shown as Box 172 which is stored on primary storage as Box 174.

Figure 9:
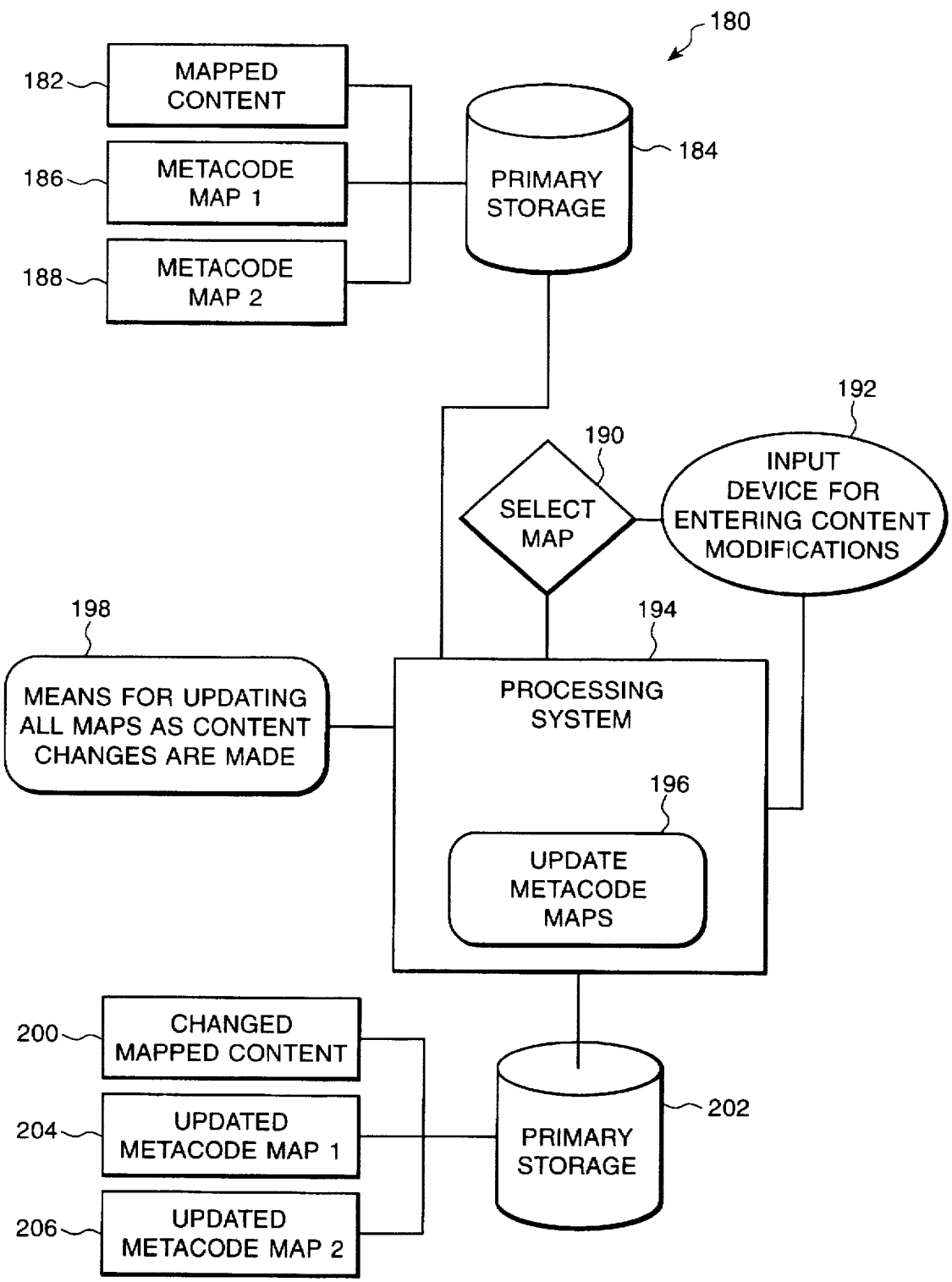
FIG. 9 is a broad flow diagram representing the modification of content with multiple associated maps according to the system and method of the invention.

FIG. 9 shows generally as 180 a system and process for modifying mapped content which has a multiplicity of metacode maps associated with it. The original mapped content, shown as Box 182, is stored in primary storage shown as Box 184. The mapped content, shown as Box 182, has a first metacode map, shown as Box 186 and a second metacode map, shown as Box 188 also stored in primary storage, shown as Box 184.

A map, either the map shown as Box 185 or the map shown as Box 188 and mapped content, shown as Box 182, is selected for use by the input process shown as Box 192. Modifications to the content are made through an input process shown as Box 192.

The processing system, shown as Box 194, reads the mapped content and all associated maps, shown as Box 186 and Box 188. The processing system, as shown in Box 194, reads the changes to the mapped content, as shown in Box 200, and uses the changes to update, as shown in Box 196, the metacode maps using means, as shown in Box 198, for modifying the metacode maps. The modified mapped content, shown as Box 200 is stored in primary storage represented by Box 202. The modified metacode maps, represented by Box 204 and 206 are stored in primary storage as represented by Box 202.

Figure 10:
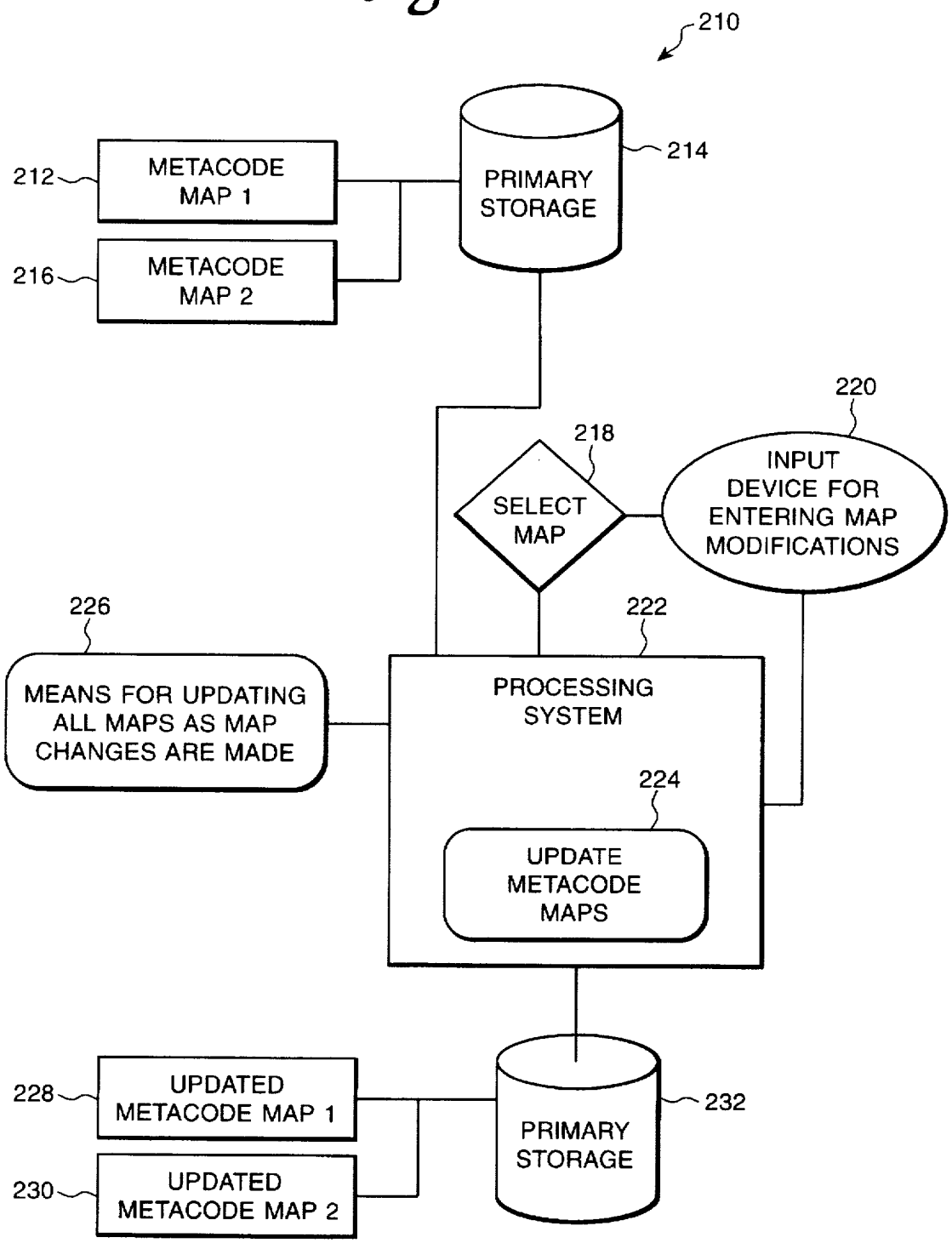
FIG. 10 is a broad flow diagram representing a modification of a metacode map with multiple associated metacode maps according to the system and method of the invention; wherein the same numerals denote like parts.

FIG. 10 shows generally as 210 a system and process for modifying a metacode map which has multiple metacode maps associated with it. The original metacode map, shown as Box 212 is stored in primary storage shown as Box 214. The metacode map, shown as Box 212, has a second metacode map, shown as Box 216, also stored in primary storage represented as Box 214. A map is selected for modification by a process represented as Box 218. Modifications to the selected map are made through an input process shown as Box 220. The processing system, represented as Box 222, reads the selected metacode map and all associated maps, shown as Boxes 212 and 216. The processing system, represented as Box 222, reads the changes and uses them to update the metacode maps as shown in Box 224. Means for modifying the metacode maps, shown as Box 226, are supplied to the processing system, represented by Box 222, to allow the processing system, represented by Box 222, to perform the updates shown as Box 224. The modified maps are stored in primary storage represented as Box 232 as updated metacode maps shown as Boxes 228 and 230.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

We claim:

1. A computer system for the manipulation of the architecture and content of a document having a plurality of metacodes and content by producing a first map of metacodes and their addresses of use in association with mapped content; said system comprising:

metacode map distinct storage means;

means for providing a menu of metacodes to said metacode storage means;

and means for compiling said metacodes of the menu by locating, detecting and addressing the metacodes in the document to constitute the map and storing the map in the metacode storage means; and means for resolving the content and the metacode map into the document.

2. A system as claimed in claim 1 further comprising mapped content distinct storage means.

3. A system as claimed in claim 1 further comprising raw content distinct storage means.

4. A system as claimed in claim 1 further comprising means for reading a document having first mapped content and a first multiplicity of metacodes constituting in whole or in part, the menu and detecting, locating and storing the first multiplicity of metacodes, in whole or in part, to constitute the map.

5. A system as claimed in claim 1 further comprising means for comparing the multiplicity of metacodes in the map with a predetermined set of criteria.

6. A system as claimed in claim 1 further comprising means for amending the first map to produce a second map.

7. A system as claimed in claim 1 further comprising means for applying the first map to mapped content to provide first differentiated data.

8. A system as claimed in claim 7 wherein the mapped content is the first mapped content.

9. A system as claimed in claim 1 further comprising means for providing a multiplicity of maps in association with a mapped single content.

10. A system as claimed in claim 1 further comprising means for amending a plurality of maps in consequence of an amendment of mapped content.

11. A system as claimed in claim 1 further comprising means for amending a plurality of maps in consequence of an amendment of an associated metacode map.

12. A system as claimed in claim 1 comprising means for amending a first plurality of maps to produce a second plurality of amended maps in a plurality of distinct storage means.

13. A system as claimed in claim 1 wherein metacode is a description code.

14. A method for producing a first map of metacodes and their addresses of use in association with mapped content and stored in distinct map storage means, the method comprising:

providing the mapped content to mapped content storage means;

providing a menu of metacodes; and compiling a map of the metacodes in the distinct storage means, by locating, detecting and addressing the metacodes; and providing the document as the content of the document and the metacode map of the document.

15. A method as claimed in claim 14 further comprising:

detecting and locating a multiplicity of metacodes constituting the menu in a document;

storing the multiplicity of metacodes, in whole or in part, in the distinct storage means;

detecting and locating mapped content in the document;

and storing the mapped content, in whole or in part, in the mapped content storage means.

16. A method as claimed in claim 15 further comprising amending the multiplicity of the metacodes to produce a second map.

17. A method as claimed in claim 16 wherein metacode is a description code.

18. A method as claimed in claim 14 further comprising comparing the multiplicity of metacodes in the map with a predetermined set of criteria.

19. A method as claimed in claim 18 further comprising applying the first map to the mapped content to provide a differentiated document.

20. A method for producing from a document made up of metacodes and content, a map of metacodes and their addresses of use in association with mapped content of the document and stored in distinct map storage means, the method comprising:

(a) reading the content of the document until a metacode is found;

(b) copying the content and storing the copied content in a mapped content storage;

(c) noting in the map the found metacode and its position in the content;

(d) repeating the processing of (a)–(c) until the entire document has been processed; and then (e) providing the document as the content of the document separately from the metacode map of the document.

* * * * *

(12) EX PARTE REEXAMINATION CERTIFICATE (7634th)

United States Patent
Vulpe et al.

(10) Number: US 5,787,449 C1
(45) Certificate Issued: Jul. 27, 2010

(54) METHOD AND SYSTEM FOR MANIPULATING THE ARCHITECTURE AND THE CONTENT OF A DOCUMENT SEPARATELY FROM EACH OTHER

(75) Inventors: Michel J. M. G. Vulpe, Toronto (CA); Stephan P. Owens, Toronto (CA)

(73) Assignee: I4I Limited Partnership, Toronto (CA)

Reexamination Request:
No. 90/010,347, Nov. 21, 2008

Reexamination Certificate for:
Patent No.: 5,787,449
Issued: Jul. 28, 1998
Appl. No.: 08/253,263
Filed: Jun. 2, 1994

(51) Int. Cl.
*G06F 17/21* (2006.01)

(52) U.S. Cl. ....................................................... 715/203
(58) Field of Classification Search ........................ None
See application file for complete search history.

(56) References Cited

U.S. PATENT DOCUMENTS

| | | | |
|---|---|---|---|
| 4,751,740 A | 6/1988 | Wright |
| 4,803,643 A | 2/1989 | Hickey |
| 4,959,769 A | 9/1990 | Cooper |
| 5,119,491 A | 6/1992 | Iwai |
| 5,181,162 A | 1/1993 | Smith |
| 5,289,574 A | 2/1994 | Sawyer |
| 5,369,573 A | 11/1994 | Holloran |
| 5,633,996 A | 5/1997 | Hayashi |
| 6,101,512 A | 8/2000 | DeRose |

OTHER PUBLICATIONS

Canadian Patent Document 2,048,039.*

Ian A. Macleod, Storage and Retrieval of Structured Documents, vol. 26, No. 2, Information Processing & Management (1990).

Roger Molesworth, The Open Interchange or Electronic Documents, IEE Colloquium (May 21, 1991).

Arno J. H. M. Peels et al, Document Architecture and Text Formatting, ACM Transactions on Office Information Systems, vol. 3, No. 4, pp. 347–369 (Oct. 1985).

Vicent Quint et al, Grif: An Interactive System for Structured Document Manipulation, Text Processing and Document Manipulation, Proceedings of the International Conference, University of Nottingham (Apr. 14–16, 1986).

Brian K. Reid, A High–Level Approach to Computer Document Formatting, Conference Record of the 7th Annual ACM Symposium on Principles of Programming Languages, Las Vegas, Nevada (Jan. 28–30, 1980).

Rebecca Wirfs–Brock et al, Designing Object–Oriented Software, Prentice Hall PTR, Englewood Cliffs, New Jersey (1990).

Min Zheng et al., Text–Hypertext Mutual Conversion and Hypertext Interchange through SGML, Conference on Information and Knowledge Management Proceedings, Washington, D.C., United States (1993).

International Standard (ISO) 8879, Information Processing—Text and office systems—Standard Generalized Markup Language (SGML), First Edition (Oct. 15, 1986).

Grif Adds SQL, Windows to SGML Suite, Developer's Toolkit Also New, vol. 22, No. 14, Seybold Report on Publishing Systems (Apr. 5, 1993).

(Continued)

*Primary Examiner*—Alexander J Kosowski

(57) ABSTRACT

A system and method for the separate manipulation of the architecture and content of a document, particularly for data representation and transformations. The system, for use by computer software developers, removes dependency on document encoding technology. A map of metacodes found in the document is produced and provided and stored separately from the document. The map indicates the location and addresses of metacodes in the document. The system allows of multiple views of the same content. the ability to work solely on structure and solely on content, storage efficiency of multiple versions and efficiency of operation.

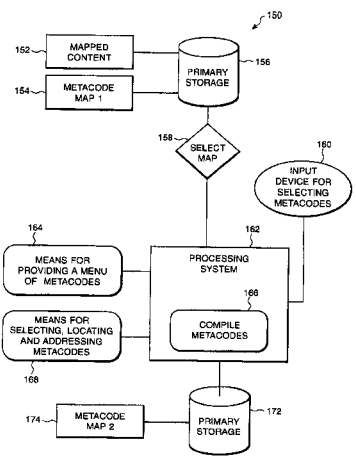

OTHER PUBLICATIONS

Mark Walter, Status Report on SGML: Notes from SGML '93, vol. 23, No. 9, Seybold Report on Publishing Systems (Jan. 3, 1994).

Frank Gilbane, SGML & SGML Open, vol. 1, No. 2, The Gilbane Report (May 1993).

Frank Gilbane, Document Management & Database, vol. 1, No. 3, The Gilbane Report (Jul. 1993).

Donald D. Chamberlin et al, Graphic Application of the Standard Generalized Markup Language (SGML), vol. 11, No. 4, pp. 343–358, Comput. & Graphics (1987).

D.D. Cowan, Experiences with RITA—A Structured–Document Editor, Research Report CS–90–35, Computer Science Department & Computer Systems Group, University of Waterloo (1990).

G.M. Pianosi, Waterloo Rita Document Class Generator Reference, Information Workbench, Watcom Publications Limited (1990).

G. de V. Smit et al, Manipulating Partial Documents in a Syntax–Directed Environment, Research Report CS–90–02, Department of Computer Science, University of Waterloo (Jan. 1990).

G. de V. Smit, A Formatter–Independent Structured Document Preparation System, Research Report CS–87–40, Department of Computer Science, University of Waterloo (Jul. 1987).

E.W. Mackie, Waterloo Rita Tutorial and Reference 3rd Edition, Information Workbench, Watcom Publications Limited (1990).

Kenneth P. Brooks, A Two–view Document Editor with User–definable Document Structure, Digital Systems Research Center (Nov. 1, 1988).

Kenneth P. Brooks, Lilac: A Two–View Document Editor, Digital Equipment Corporation, Computer, vol. 24, Issue 6 (Jun. 1991).

Otto Smith, Chapter 14 Textedit, Inside Macintosh, vol. 5, Apple Computer, Inc., Addison–Wesley Publishing Company (1993).

Amy L. Hinds, Maintaining Multiple Versions of a Document, Saber Software, ACM SIGDOC 89 (Nov. 8–10, 1989).

Brian Livingston, Extending File Translation Capabilities, Personal Computing, vol. 14 No. 5 (May 25, 1990).

Toyoda K. Kumagai et al, SGML Document Structure Editor, National Technical Report, Matsushita Electric Industry Company, vol. 36, No. 5, Japan, pp. 89–95 (Oct. 1990).

Richard Furuta, Complexity in Structured Documents: User Interface Issues, Proceedings of the Fourth International Conference on Text Processing (Oct. 1987).

Lynne A. Price, A Parser Generator for SGML, Proceedings of the Fourth International Conference on Text Processing (Oct. 1987).

Jan Holdam, Gipsy—a Grammar Based Interactive Document Processing System, Proceedings of the Third International Conference on Text Processing Systems (Oct. 1986).

Cowan, D.D., et al., *Rita—an editor and user interface for manipulating structured documents*, Electronic Publishing, vol. 4(3), pp. 125–150, published Sep. 1991.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 14-20 is confirmed.

Claims 1-13 were not reexamined.

* * * * *